(12) United States Patent
Terai

(10) Patent No.: US 8,019,213 B2
(45) Date of Patent: Sep. 13, 2011

(54) EXCHANGEABLE LENS AND IMAGING DEVICE

(75) Inventor: Takashi Terai, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/800,155

(22) Filed: May 10, 2010

(65) Prior Publication Data

US 2010/0310244 A1   Dec. 9, 2010

(30) Foreign Application Priority Data

Jun. 3, 2009   (JP) ................. P2009-134333

(51) Int. Cl.
G03B 17/00 (2006.01)
G03B 3/00 (2006.01)
G03B 13/00 (2006.01)
G02B 7/02 (2006.01)

(52) U.S. Cl. ............. 396/85; 396/137; 359/826

(58) Field of Classification Search ............ 396/85, 396/75, 137; 359/825, 826
See application file for complete search history.

(56) References Cited

U.S. PATENT DOCUMENTS

| 5,287,137 | A  | * | 2/1994  | Hara et al. ........... 396/87 |
| 6,822,810 | B2 | * | 11/2004 | Ichino ............... 359/696 |
| 7,466,504 | B1 | * | 12/2008 | Koyama .............. 359/819 |
| 2002/0025148 | A1 | * | 2/2002  | Sato ................. 396/72 |
| 2007/0242940 | A1 | * | 10/2007 | Yumiki et al. ........ 396/79 |
| 2008/0084621 | A1 | * | 4/2008  | Hino ................ 359/825 |

FOREIGN PATENT DOCUMENTS

JP       06-011636 A       1/1994

* cited by examiner

*Primary Examiner* — Clayton E Laballe
*Assistant Examiner* — Noam Reisner
(74) *Attorney, Agent, or Firm* — Lerner, David, Littenberg, Krumholz & Mentlik, LLP

(57) ABSTRACT

An exchangeable lens includes: a cam member; a plurality of lenses; a lens holding frame; a drive motor; a worm screw; a worm wheel; a planetary roller; a first rotating member; a first bearing seat; a second rotating member; and a second bearing seat.

7 Claims, 8 Drawing Sheets

EXCHANGEABLE LENS AND IMAGING DEVICE

CROSS-REFERENCE TO RELATED APPLICATION

The present application claims priority from Japanese Patent Application No. JP 2009-134333 filed in the Japanese Patent Office on Jun. 3, 2009, the entire content of which is incorporated herein by reference.

BACKGROUND OF THE INVENTION

1. Field of the Invention

The present invention relates to the technical field about exchangeable lenses and imaging devices. Specifically, the present invention relates to a technical field for allowing autofocus operation and manual focus operation without operating the switch operation unit to thereby enhance the usability without causing a large rise in the cost.

2. Description of the Related Art

Among various kinds of imaging devices such as video camcorders and still cameras are ones that are so configured as to be capable of both of autofocus operation and manual focus operation in focusing and zooming.

For example, they are so configured as to be capable of selectively carrying out, in focusing, autofocus operation by driving of a drive motor and manual focus operation in which the operation unit is manually operated.

At the time of photography by use of such an imaging device, in some cases, the autofocus operation is automatically carried out in the autofocus mode, and thereafter the photographer operates the switch operation unit to set the manual focus mode and carry out focusing based on fine adjustment by the manual focus operation. Also when failure in the autofocus operation occurs, the photographer operates the switch operation unit and carries out focusing by the manual focus operation in some cases.

However, if the photographer operates the switch operation unit to attempt to carry out the manual focus operation after the autofocus operation, the fast shooting performance is lowered because of the operation of the switch operation unit, and thus possibly the photographer misses a photographic opportunity.

To address this problem, as one of the related-art imaging devices, there has been proposed an imaging device that employs an ultrasonic motor as the drive source of the autofocus operation to allow the autofocus operation and the manual focus operation without demanding the operation of the switch operation unit (refer to e.g. Japanese Patent No. 3205031 (hereinafter, Patent Document 1)).

SUMMARY OF THE INVENTION

However, the imaging device described in Patent Document 1 involves a problem of high manufacturing cost because it employs the ultrasonic motor as the drive source and the ultrasonic motor and the drive circuitry thereof are very expensive.

Furthermore, this imaging device is so configured that, in the manual focus operation, the rotation of the gear designed to rotate in the autofocus operation is prevented by the frictional force between a rotor and a stator. Therefore, in the manual focus operation, the operation unit needs to be operated by a force larger than the frictional force generated between the rotor and the stator, which causes another problem of the imposition of restrictions on the weight of the movable lens and the acceleration of the movable lens at the time of the movement thereof.

There is a need for the present invention to provide an exchangeable lens and an imaging device that are allowed to overcome the above-described problems and have enhanced usability without causing a large rise in the cost.

According to an embodiment of the present invention, there is provided an exchangeable lens including a cam member configured to have a cam driving part and be capable of rotating in a direction around an optical axis, a plurality of lenses configured to be disposed on the optical axis and include at least one movable lens that is capable of moving along the optical axis direction and allows focus adjustment or zoom adjustment through the movement of the movable lens along the optical axis direction, and a lens holding frame configured to have an engagement part slidably engaged with the cam driving part of the cam member and hold the movable lens. The lens holding frame is moved monolithically with the movable lens along the optical axis direction in linkage with the rotation of the cam member in the direction around the optical axis. The exchangeable lens further includes a drive motor configured to serve as a drive source for the movement of the movable lens along the optical axis direction, a worm screw configured to be fixed to a motor shaft of the drive motor, a worm wheel configured to be meshed with the worm screw, and a planetary roller configured to be supported on the cam member rotatably in a direction around an axis perpendicular to the optical axis and be revolved around the optical axis in linkage with the rotation of the cam member. The exchangeable lens further includes a first rotating member configured to be in contact with the outer circumferential surface of the planetary roller in a state of being biased in such a direction as to be pressed against the outer circumferential surface of the planetary roller, and be rotated in the direction around the optical axis through transmission of driving force of the drive motor to the first rotating member via the worm screw and the worm wheel, and a first bearing seat configured to receive the first rotating member on the opposite side to the planetary roller. The exchangeable lens further includes a second rotating member configured to be in contact with the outer circumferential surface of the planetary roller from the opposite side to the first rotating member in a state of being biased in such a direction as to be pressed against the outer circumferential surface of the planetary roller, and be rotated in the direction around the optical axis by manual operation, and a second bearing seat configured to receive the second rotating member on the opposite side to the planetary roller and restrict the rotation of the second rotating member in the direction around the optical axis at the time of driving of the drive motor. In the exchangeable lens, the worm screw and the worm wheel are so configured as to satisfy a condition represented by $\mu \cdot \cos \alpha > \sin \alpha$, where $\alpha$ is the lead angle of the worm screw and $\mu$ is the friction coefficient on the contact surface between the worm screw and the worm wheel.

Therefore, in this exchangeable lens, the operation of the switch operation unit is not demanded for the switching between the autofocus operation and the manual focus operation. Furthermore, in the manual focus operation, the rotation of the first rotating member is restricted by the frictional force generated between the worm screw and the worm wheel.

In the above-described exchangeable lens, it is preferable that the number of threads of the worm screw be equal to or smaller than three.

By setting the number of threads of the worm screw equal to or smaller than three, the lead angle $\alpha$ is made small.

In the above-described exchangeable lens, it is preferable that the first bearing seat be a ball bearing seat.

By using a ball bearing seat as the first bearing seat, the frictional force generated between the first rotating member and the first bearing seat is made small.

In the above-described exchangeable lens, it is preferable that the second bearing seat be a slide bearing seat.

By using a slide bearing seat as the second bearing seat, the frictional force generated between the second rotating member and the second bearing seat is made large.

In the above-described exchangeable lens, it is preferable that the radius of the second bearing seat be larger than the radius of the first bearing seat.

By setting the radius of the second bearing seat larger than that of the first bearing seat, the frictional force generated between the second rotating member and the second bearing seat is made large.

According to another embodiment of the present invention, there is provided an imaging device including a device main body formed by disposing predetermined components inside and outside an external case and an exchangeable lens that is attachable and detachable to and from the device main body. The exchangeable lens includes a cam member configured to have a cam driving part and be capable of rotating in a direction around an optical axis, a plurality of lenses configured to be disposed on the optical axis and include at least one movable lens that is capable of moving along the optical axis direction and allows focus adjustment or zoom adjustment through the movement of the movable lens along the optical axis direction, and a lens holding frame configured to have an engagement part slidably engaged with the cam driving part of the cam member and hold the movable lens. The lens holding frame is moved monolithically with the movable lens along the optical axis direction in linkage with the rotation of the cam member in the direction around the optical axis. The exchangeable lens further includes a drive motor configured to serve as a drive source for the movement of the movable lens along the optical axis direction, a worm screw configured to be fixed to a motor shaft of the drive motor, a worm wheel configured to be meshed with the worm screw, and a planetary roller configured to be supported on the cam member rotatably in a direction around an axis perpendicular to the optical axis and be revolved around the optical axis in linkage with the rotation of the cam member. The exchangeable lens further includes a first rotating member configured to be in contact with the outer circumferential surface of the planetary roller in a state of being biased in such a direction as to be pressed against the outer circumferential surface of the planetary roller, and be rotated in the direction around the optical axis through transmission of driving force of the drive motor to the first rotating member via the worm screw and the worm wheel, and a first bearing seat configured to receive the first rotating member on the opposite side to the planetary roller. The exchangeable lens further includes a second rotating member configured to be in contact with the outer circumferential surface of the planetary roller from the opposite side to the first rotating member in a state of being biased in such a direction as to be pressed against the outer circumferential surface of the planetary roller, and be rotated in the direction around the optical axis by manual operation, and a second bearing seat configured to receive the second rotating member on the opposite side to the planetary roller and restrict the rotation of the second rotating member in the direction around the optical axis at the time of driving of the drive motor. In the imaging device, the worm screw and the worm wheel are so configured as to satisfy a condition represented by $\mu \cdot \cos \alpha > \sin \alpha$, where $\alpha$ is the lead angle of the worm screw and $\mu$ is the friction coefficient on the contact surface between the worm screw and the worm wheel.

Therefore, in this imaging device, the operation of the switch operation unit is not demanded for the switching between the autofocus operation and the manual focus operation. Furthermore, in the manual focus operation, the rotation of the first rotating member is restricted by the frictional force generated between the worm screw and the worm wheel.

According to another embodiment of the present invention, there is provided another imaging device including a device main body formed by disposing predetermined components inside and outside an external case and a lens barrel provided for the device main body. The lens barrel includes a cam member configured to have a cam driving part and be capable of rotating in a direction around an optical axis, a plurality of lenses configured to be disposed on the optical axis and include at least one movable lens that is capable of moving along the optical axis direction and allows focus adjustment or zoom adjustment through the movement of the movable lens along the optical axis direction, and a lens holding frame configured to have an engagement part slidably engaged with the cam driving part of the cam member and hold the movable lens. The lens holding frame is moved monolithically with the movable lens along the optical axis direction in linkage with the rotation of the cam member in the direction around the optical axis. The lens barrel further includes a drive motor configured to serve as a drive source for the movement of the movable lens along the optical axis direction, a worm screw configured to be fixed to a motor shaft of the drive motor, a worm wheel configured to be meshed with the worm screw, and a planetary roller configured to be supported on the cam member rotatably in a direction around an axis perpendicular to the optical axis and be revolved around the optical axis in linkage with the rotation of the cam member. The lens barrel further includes a first rotating member configured to be in contact with the outer circumferential surface of the planetary roller in a state of being biased in such a direction as to be pressed against the outer circumferential surface of the planetary roller, and be rotated in the direction around the optical axis through transmission of driving force of the drive motor to the first rotating member via the worm screw and the worm wheel, and a first bearing seat configured to receive the first rotating member on the opposite side to the planetary roller. The lens barrel further includes a second rotating member configured to be in contact with the outer circumferential surface of the planetary roller from the opposite side to the first rotating member in a state of being biased in such a direction as to be pressed against the outer circumferential surface of the planetary roller, and be rotated in the direction around the optical axis by manual operation, and a second bearing seat configured to receive the second rotating member on the opposite side to the planetary roller and restrict the rotation of the second rotating member in the direction around the optical axis at the time of driving of the drive motor. In the imaging device, the worm screw and the worm wheel are so configured as to satisfy a condition represented by $\mu \cdot \cos \alpha > \sin \alpha$, where $\alpha$ is the lead angle of the worm screw and $\mu$ is the friction coefficient on the contact surface between the worm screw and the worm wheel.

Therefore, in this imaging device, the operation of the switch operation unit is not demanded for the switching between the autofocus operation and the manual focus operation. Furthermore, in the manual focus operation, the rotation of the first rotating member is restricted by the frictional force generated between the worm screw and the worm wheel.

The above-described exchangeable lens according to an embodiment of the present invention includes a cam member that has a cam driving part and is capable of rotating in a direction around an optical axis, a plurality of lenses that are disposed on the optical axis and include at least one movable lens that is capable of moving along the optical axis direction and allows focus adjustment or zoom adjustment through the movement of the movable lens along the optical axis direction, and a lens holding frame that has an engagement part slidably engaged with the cam driving part of the cam member and holds the movable lens. The lens holding frame is moved monolithically with the movable lens along the optical axis direction in linkage with the rotation of the cam member in the direction around the optical axis. The exchangeable lens further includes a drive motor serving as a drive source for the movement of the movable lens along the optical axis direction, a worm screw fixed to a motor shaft of the drive motor, a worm wheel meshed with the worm screw, and a planetary roller that is supported on the cam member rotatably in a direction around an axis perpendicular to the optical axis and is revolved around the optical axis in linkage with the rotation of the cam member. The exchangeable lens further includes a first rotating member that is in contact with the outer circumferential surface of the planetary roller in a state of being biased in such a direction as to be pressed against the outer circumferential surface of the planetary roller, and is rotated in the direction around the optical axis through transmission of driving force of the drive motor to the first rotating member via the worm screw and the worm wheel, and a first bearing seat that receives the first rotating member on the opposite side to the planetary roller. The exchangeable lens further includes a second rotating member that is in contact with the outer circumferential surface of the planetary roller from the opposite side to the first rotating member in a state of being biased in such a direction as to be pressed against the outer circumferential surface of the planetary roller, and is rotated in the direction around the optical axis by manual operation, and a second bearing seat that receives the second rotating member on the opposite side to the planetary roller and restricts the rotation of the second rotating member in the direction around the optical axis at the time of driving of the drive motor. In the exchangeable lens, the worm screw and the worm wheel are so configured as to satisfy a condition represented by $\mu \cdot \cos \alpha > \sin \alpha$, where $\alpha$ is the lead angle of the worm screw and $\mu$ is the friction coefficient on the contact surface between the worm screw and the worm wheel.

Thus, the fast shooting performance in photography is ensured and the usability can be enhanced without causing a large rise in the cost.

Furthermore, the configuration is not employed in which, in the manual focus operation, the rotation of the gear designed to rotate in the autofocus operation is prevented by the frictional force generated between a rotor and a stator. This can reduce restrictions on the weight of the movable lens and the acceleration of the movable lens at the time of the movement thereof.

According to another embodiment of the present invention, the number of threads of the worm screw is equal to or smaller than three. Thus, the lead angle $\alpha$ can be made small. Therefore, size reduction of the worm screw is facilitated and size reduction of the exchangeable lens can be achieved.

According to another embodiment of the present invention, the first bearing seat is a ball bearing seat. This can reduce the torque of the drive motor.

According to another embodiment of the present invention, the second bearing seat is a slide bearing seat. Thus, the frictional force generated between the second bearing seat and the second rotating member is made large, which can surely restrict the rotation of the second rotating member by small force in the autofocus operation.

According to another embodiment of the present invention, the radius of the second bearing seat is larger than the radius of the first bearing seat. Therefore, large frictional force can be generated between the second bearing seat and the second rotating member. Thus, the rotation of the second rotating member can be surely restricted by smaller force in the autofocus operation.

The above-described imaging device according to another embodiment of the present invention includes a device main body formed by disposing predetermined components inside and outside an external case and an exchangeable lens that is attachable and detachable to and from the device main body. The exchangeable lens includes a cam member that has a cam driving part and is capable of rotating in a direction around an optical axis, a plurality of lenses that are disposed on the optical axis and include at least one movable lens that is capable of moving along the optical axis direction and allows focus adjustment or zoom adjustment through the movement of the movable lens along the optical axis direction, and a lens holding frame that has an engagement part slidably engaged with the cam driving part of the cam member and holds the movable lens. The lens holding frame is moved monolithically with the movable lens along the optical axis direction in linkage with the rotation of the cam member in the direction around the optical axis. The exchangeable lens further includes a drive motor serving as a drive source for the movement of the movable lens along the optical axis direction, a worm screw fixed to a motor shaft of the drive motor, a worm wheel meshed with the worm screw, and a planetary roller that is supported on the cam member rotatably in a direction around an axis perpendicular to the optical axis and is revolved around the optical axis in linkage with the rotation of the cam member. The exchangeable lens further includes a first rotating member that is in contact with the outer circumferential surface of the planetary roller in a state of being biased in such a direction as to be pressed against the outer circumferential surface of the planetary roller, and is rotated in the direction around the optical axis through transmission of driving force of the drive motor to the first rotating member via the worm screw and the worm wheel, and a first bearing seat that receives the first rotating member on the opposite side to the planetary roller. The exchangeable lens further includes a second rotating member that is in contact with the outer circumferential surface of the planetary roller from the opposite side to the first rotating member in a state of being biased in such a direction as to be pressed against the outer circumferential surface of the planetary roller, and is rotated in the direction around the optical axis by manual operation, and a second bearing seat that receives the second rotating member on the opposite side to the planetary roller and restricts the rotation of the second rotating member in the direction around the optical axis at the time of driving of the drive motor. In the imaging device, the worm screw and the worm wheel are so configured as to satisfy a condition represented by $\mu \cdot \cos \alpha > \sin \alpha$, where $\alpha$ is the lead angle of the worm screw and $\mu$ is the friction coefficient on the contact surface between the worm screw and the worm wheel.

Thus, the fast shooting performance in photography is ensured and the usability can be enhanced without causing a large rise in the cost.

Furthermore, the configuration is not employed in which, in the manual focus operation, the rotation of the gear designed to rotate in the autofocus operation is prevented by the frictional force generated between a rotor and a stator. This can reduce restrictions on the weight of the movable lens and the acceleration of the movable lens at the time of the movement thereof.

The above-described other imaging device according to another embodiment of the present invention includes a device main body formed by disposing predetermined components inside and outside an external case and a lens barrel provided for the device main body. The lens barrel includes a cam member that has a cam driving part and is capable of rotating in a direction around an optical axis, a plurality of lenses that are disposed on the optical axis and include at least one movable lens that is capable of moving along the optical axis direction and allows focus adjustment or zoom adjustment through the movement of the movable lens along the optical axis direction, and a lens holding frame that has an engagement part slidably engaged with the cam driving part of the cam member and holds the movable lens. The lens holding frame is moved monolithically with the movable lens along the optical axis direction in linkage with the rotation of the cam member in the direction around the optical axis. The lens barrel further includes a drive motor serving as a drive source for the movement of the movable lens along the optical axis direction, a worm screw fixed to a motor shaft of the drive motor, a worm wheel meshed with the worm screw, and a planetary roller that is supported on the cam member rotatably in a direction around an axis perpendicular to the optical axis and is revolved around the optical axis in linkage with the rotation of the cam member. The lens barrel further includes a first rotating member that is in contact with the outer circumferential surface of the planetary roller in a state of being biased in such a direction as to be pressed against the outer circumferential surface of the planetary roller, and is rotated in the direction around the optical axis through transmission of driving force of the drive motor to the first rotating member via the worm screw and the worm wheel, and a first bearing seat that receives the first rotating member on the opposite side to the planetary roller. The lens barrel further includes a second rotating member that is in contact with the outer circumferential surface of the planetary roller from the opposite side to the first rotating member in a state of being biased in such a direction as to be pressed against the outer circumferential surface of the planetary roller, and is rotated in the direction around the optical axis by manual operation, and a second bearing seat that receives the second rotating member on the opposite side to the planetary roller and restricts the rotation of the second rotating member in the direction around the optical axis at the time of driving of the drive motor. In the imaging device, the worm screw and the worm wheel are so configured as to satisfy a condition represented by $\mu \cdot \cos \alpha > \sin \alpha$, where $\alpha$ is the lead angle of the worm screw and $\mu$ is the friction coefficient on the contact surface between the worm screw and the worm wheel.

Thus, the fast shooting performance in photography is ensured and the usability can be enhanced without causing a large rise in the cost.

Furthermore, the configuration is not employed in which, in the manual focus operation, the rotation of the gear designed to rotate in the autofocus operation is prevented by the frictional force generated between a rotor and a stator. This can reduce restrictions on the weight of the movable lens and the acceleration of the movable lens at the time of the movement thereof.

DETAILED DESCRIPTION OF THE PREFERRED EMBODIMENT

An embodiment of the present invention will be described below with reference to the accompanying drawings.

As the embodiment of the present invention, a digital still camera and an exchangeable lens provided for this digital still camera will be described.

However, the application range of the present invention is not limited to the digital still camera and the exchangeable lens provided for the digital still camera. The present invention can be widely applied to other imaging devices such as video camcorders and exchangeable lenses provided for these various kinds of imaging devices.

In the following description, the forward and backward directions, the upper and lower directions, and the right and left directions are indicated as the directions from the viewpoint of the photographer (user) at the time of photography by the digital still camera. Therefore, the subject side is defined as the front side, whereas the photographer side is defined as the back side.

The forward and backward directions, the upper and lower directions, and the right and left directions shown below are used for convenience of description, and the embodiment of the present invention is not limited by these directions.

[Entire Configuration]

Figure 1:
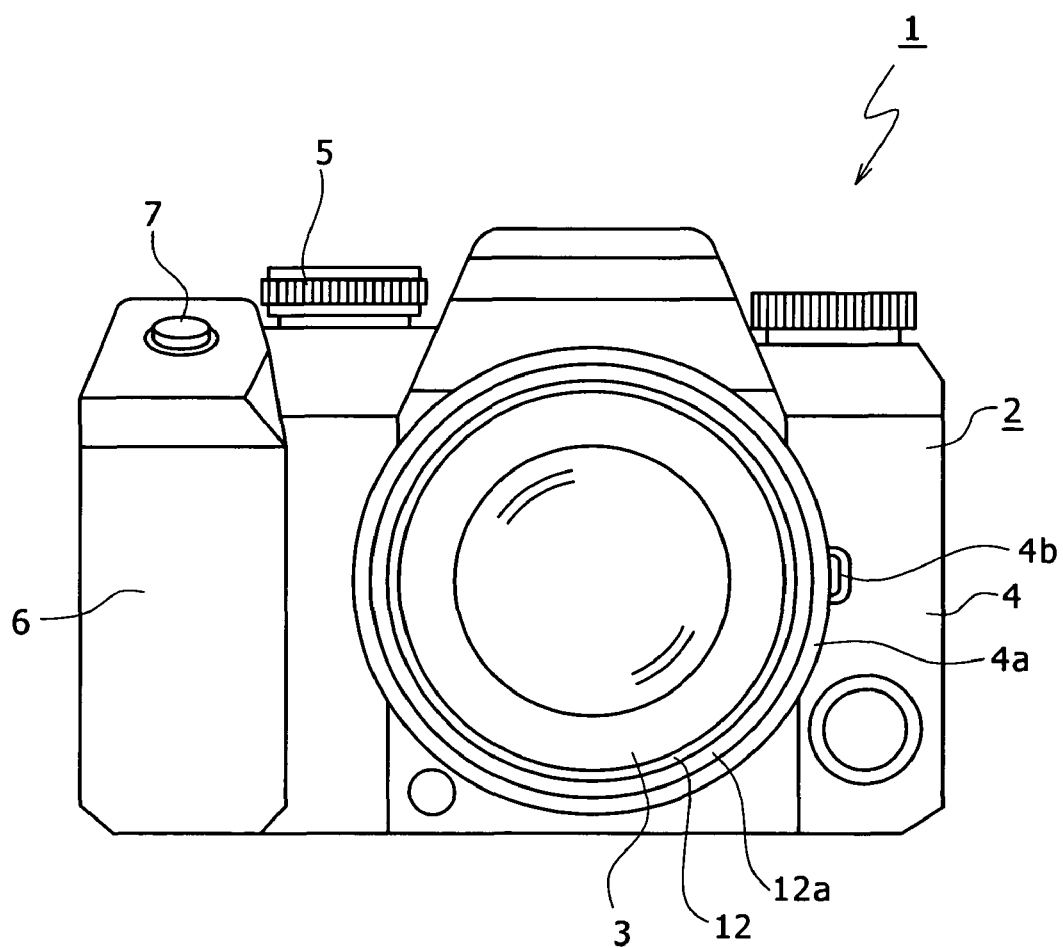
FIG. 1 is a diagram showing an embodiment of the present invention together with FIGS. 2 to 8, and is a front view of an imaging device.
Figure 2:
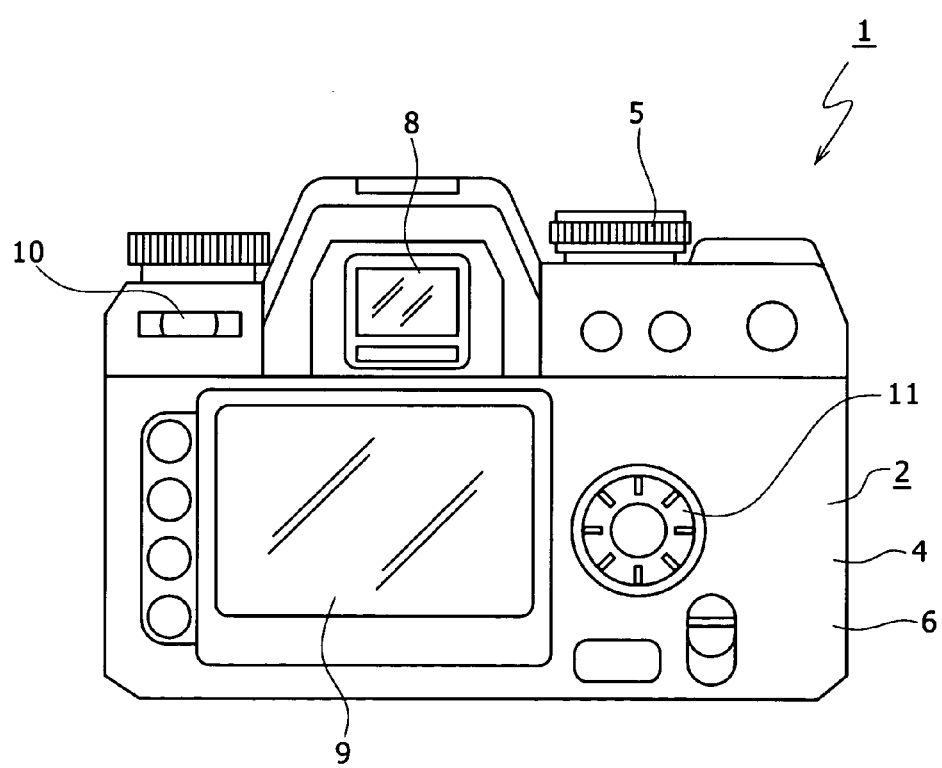
FIG. 2 is a back view of the imaging device.

As shown in FIG. 1 and FIG. 2, an imaging device (digital still camera) 1 includes a device main body 2. An exchangeable lens 3 is provided on the front surface of the device main body 2. The exchangeable lens 3 is attachable and detachable to and from the device main body 2.

[Configuration of Device Main Body]

The device main body 2 is formed by disposing the necessary components on an external case 4. A circular-ring mounting part 4a to which the exchangeable lens 3 is mounted is provided on the front surface of the external case 4. An attachment/detachment button 4b for attachment/detachment of the exchangeable lens 3 to/from the device main body 2 is provided near the mounting part 4a.

An operation dial 5 is disposed on the top surface of the device main body 2. Operating the operation dial 5 allows setting of various kinds of modes such as various photographic modes, the reproduction mode for reproducing a photographed image, and the communication mode for data intercommunication with external apparatus.

The right end part of the device main body 2 is provided as a grip part 6 grasped by the photographer. A battery housing and a card housing are formed inside the grip part 6. A battery such as a lithium ion battery is housed in the battery housing, and a memory card or the like for recording the data of photographed images can be housed in the card housing.

In the device main body 2, a photography button 7 is disposed above the grip part 6. As the state of the photography button 7, two states, the half-pressed state and the fully-pressed state, can be detected. When the photography button 7 is set to the half-pressed state, preparatory operation for acquiring a still image to be recorded about a subject, such as autofocus operation, is carried out. When the photography button 7 is turned to the fully-pressed state, exposure operation for the subject image by use of the imaging element is carried out, so that the subject is photographed.

On the back surface of the device main body 2, a finder window 8 and a monitor 9 are provided separately from each other in the vertical direction. The photographer can decide the photographic composition by visually recognizing the image of the subject through the finder window 8 or the monitor 9.

The monitor 9 is e.g. a color liquid crystal display. It can display a menu screen for setting the photograph condition and so on, and can also reproduce and display a photographed image recorded in a memory card in the reproduction mode.

A power supply switch 10 is disposed on the back surface of the device main body 2.

A direction selection key 11 is disposed on the back surface of the device main body 2. For example, pressing operation of the direction selection key 11 in four directions, i.e. the upper and lower directions and the right and left directions, is possible.

[Configuration of Exchangeable Lens]

The exchangeable lens 3 is formed by disposing the necessary components inside and outside an external cylinder 12 that has its axis direction along the anteroposterior direction and has a substantially circular cylindrical shape. A focus ring 12a having a circular ring shape is rotatably supported on the outer circumferential surface of the external cylinder 12. Manual focus operation can be carried out by manual rotational operation of the focus ring 12a.

Figure 3:
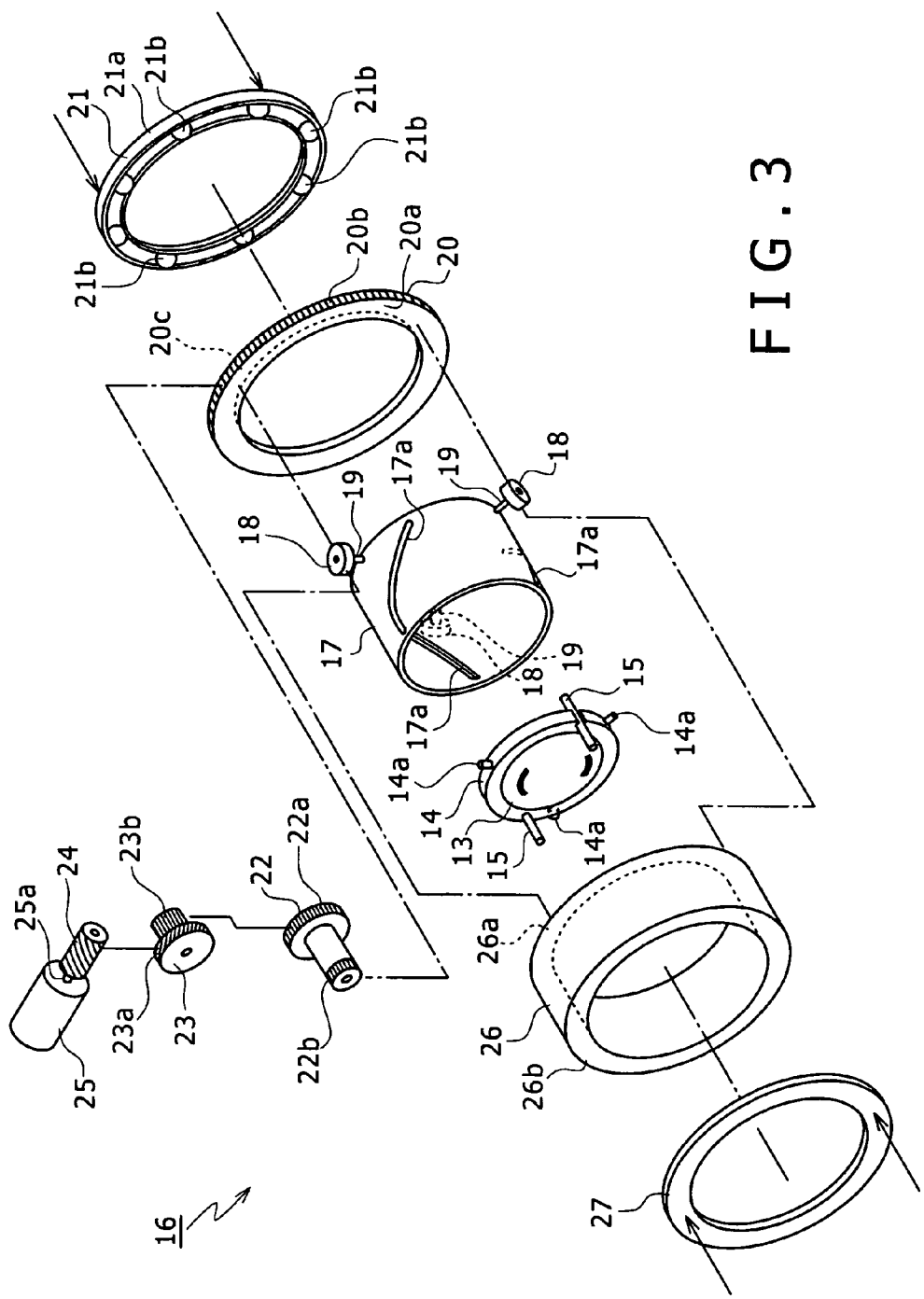
FIG. 3 is an exploded perspective view showing a lens driving mechanism and a movable lens held by a lens holding frame.
Figure 4:
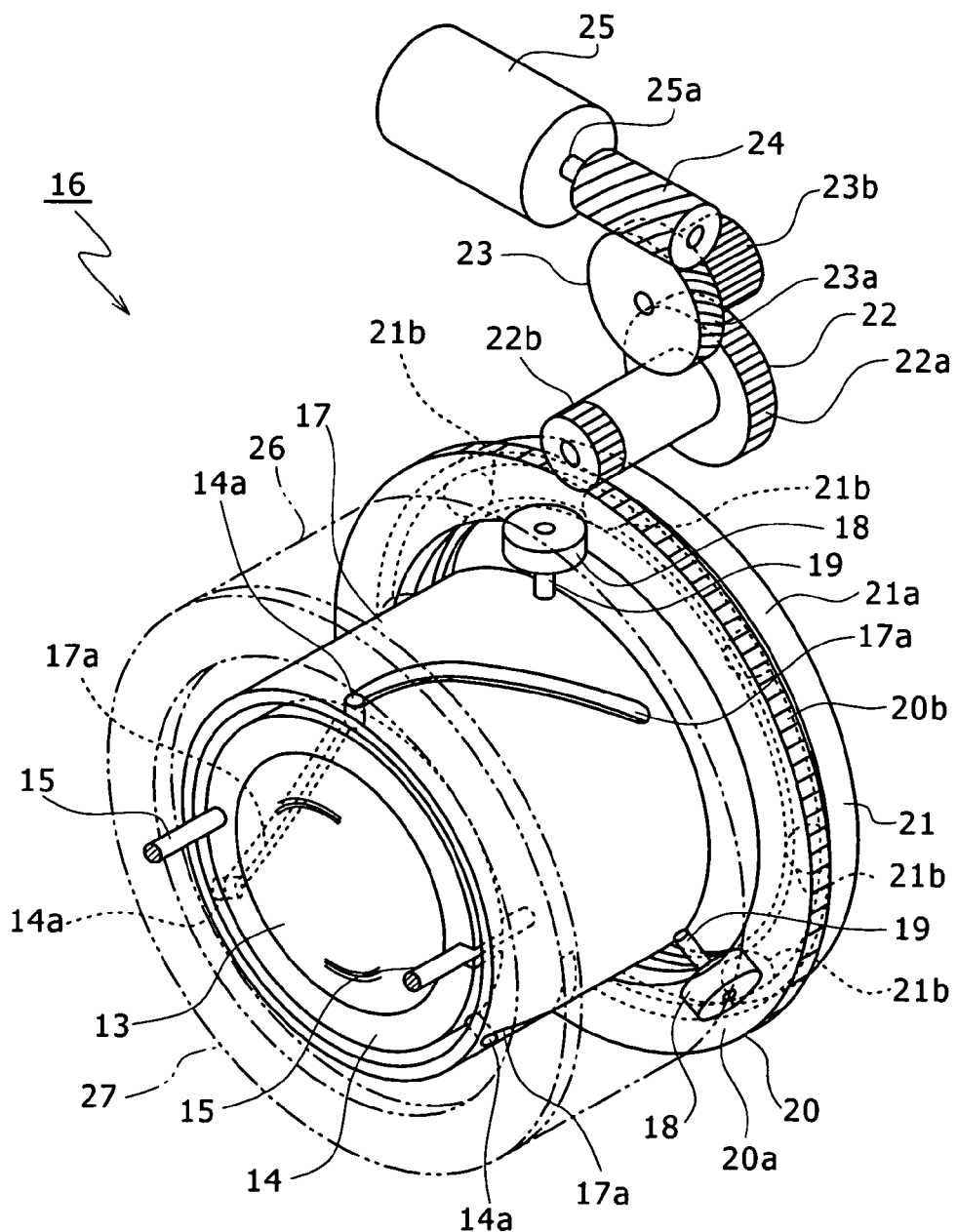
FIG. 4 is an enlarged perspective view showing the lens driving mechanism and the movable lens held by the lens holding frame.

Plural lenses are disposed inside the external cylinder 12 separately from each other in the anteroposterior direction, and at least one lens among these lenses is provided as a movable lens 13 (see FIG. 3 and FIG. 4). The movable lens 13 can move along the anteroposterior direction (optical axis direction) and is held by a lens holding frame 14.

By the movement of the movable lens 13 along the optical axis direction, e.g. focusing is carried out.

On the outer circumferential surface of the lens holding frame 14, engagement parts 14a protruding toward the outside are provided separately from each other in the circumferential direction.

Supported parts 14b are provided in the lens holding frame 14. The supported parts 14b are slidably supported by guide shafts 15 extending along the optical axis direction. Both end parts of each of the guide shafts 15 in the axis direction are fixed to fixing parts (not shown).

The movable lens 13 is moved along the optical axis direction by a lens driving mechanism 16. The lens driving mechanism 16 has a cam member 17 and planetary rollers 18 rotatably supported by the cam member 17.

The cam member 17 is formed into a substantially circular cylindrical shape and has cam trenches 17a that are separate from each other in the circumferential direction and are formed as the cam driving part. The cam trenches 17a are each formed into a shape that gradually changes in the anteroposterior direction along the circumferential direction.

Support shafts 19 protruded toward the outside are provided on the outer circumferential surface of the cam member 17 separately from each other in the circumferential direction.

The planetary rollers 18 are each supported on the tip of the support shafts 19 and can rotate in the direction around the axis direction perpendicular to the optical axis.

The engagement parts 14a of the lens holding frame 14 are each inserted into a respective one of the cam trenches 17a of the cam member 17 from the inside of the cam member 17 and are slidably engaged with the cam trenches 17a. Therefore, if the cam member 17 is rotated in the direction around the optical axis, the movable lens 13 and the lens holding frame 14 are moved in the anterior direction or the posterior direction, i.e. along the optical axis direction, depending on the rotational direction in such a manner as to be guided by the guide shafts 15.

A first rotating member 20 having a circular cylindrical shape is disposed on the back side of the planetary rollers 18. The first rotating member 20 can rotate in the direction around the optical axis. A front surface 20a of the first rotating member 20 is in contact with the outer circumferential surfaces of the planetary rollers 18 from the back side. The outer circumferential surface of the first rotating member 20 is formed as a gear part 20b.

A first bearing seat 21 formed into a substantially circular cylindrical shape is disposed on the back side of the first rotating member 20. As the first bearing seat 21, e.g. a ball bearing seat is used.

The first bearing seat 21 has a holding part 21a and spherical parts 21b disposed in the holding part 21a separately from each other in the circumferential direction. The spherical parts 21b can rotate (spin) with respect to the holding part 21a and part of each of the spherical parts 21b protrudes from the front surface of the holding part 21a toward the front side. The first bearing seat 21 is biased toward the front side by a first biasing part (not shown), and the spherical parts 21b are pressed against a back surface 20c of the first rotating member 20. Thus, by the forward biasing force received from the first bearing seat 21, the front surface 20a of the first rotating member 20 is pressed against the outer circumferential surfaces of the planetary rollers 18 from the back side.

A first deceleration gear 22 is meshed with the gear part 20b of the first rotating member 20. The first deceleration gear 22 is fabricated by forming a larger gear 22a and a smaller gear 22b monolithically with each other on the same axis. The smaller gear 22b of the first deceleration gear 22 is meshed with the gear part 20b of the first rotating member 20.

A second deceleration gear 23 is meshed with the first deceleration gear 22. The second deceleration gear 23 is fabricated by forming a worm wheel 23a having a larger diameter and a transmission gear 23b having a smaller diameter monolithically with each other on the same axis. The transmission gear 23b of the second deceleration gear 23 is meshed with the larger gear 22a of the first deceleration gear 22.

For example, a worm screw 24 in which the number of threads is set equal to or smaller than three is meshed with the second deceleration gear 23. The worm screw 24 is fixed to a motor shaft 25a of a drive motor 25 and is meshed with the worm wheel 23a of the second deceleration gear 23. As the drive motor 25, e.g. a direct current (DC) motor or a stepping motor is used.

Because the worm screw 24 is meshed with the worm wheel 23a, a load is given to the worm screw 24 along the rotation axis direction. However, a bearing for receiving this load is provided. Because the load given along the rotation axis direction can be received by the bearing, the smooth rotational operation of the worm screw 24 can be ensured.

A second rotating member 26 having a circular cylindrical shape is disposed on the front side of the planetary rollers 18. The second rotating member 26 can rotate in the direction around the optical axis. The inner diameter of the second rotating member 26 is set larger than the outer diameter of the cam member 17, and a back surface 26a of the second rotating member 26 is in contact with the outer circumferential surfaces of the planetary rollers 18 from the front side. The second rotating member 26 is rotated in the direction around the optical axis in linkage with the rotation of the focus ring 12a supported on the outer circumferential surface of the external cylinder 12.

A second bearing seat 27 formed into a circular cylindrical shape is disposed on the front side of the second rotating member 26. As the second bearing seat 27, e.g. a slide bearing seat is used.

The second bearing seat 27 is biased toward the back side by a second biasing part (not shown), and the back surface thereof is pressed against a front surface 26b of the second rotating member 26. Thus, by the backward biasing force received from the second bearing seat 27, the back surface 26a of the second rotating member 26 is pressed against the outer circumferential surfaces of the planetary rollers 18 from the front side.

As described above, the planetary rollers 18 are in such a state as to be sandwiched between the second rotating member 26 and the first rotating member 20 in the anteroposterior direction (optical axis direction).

Figure 5:
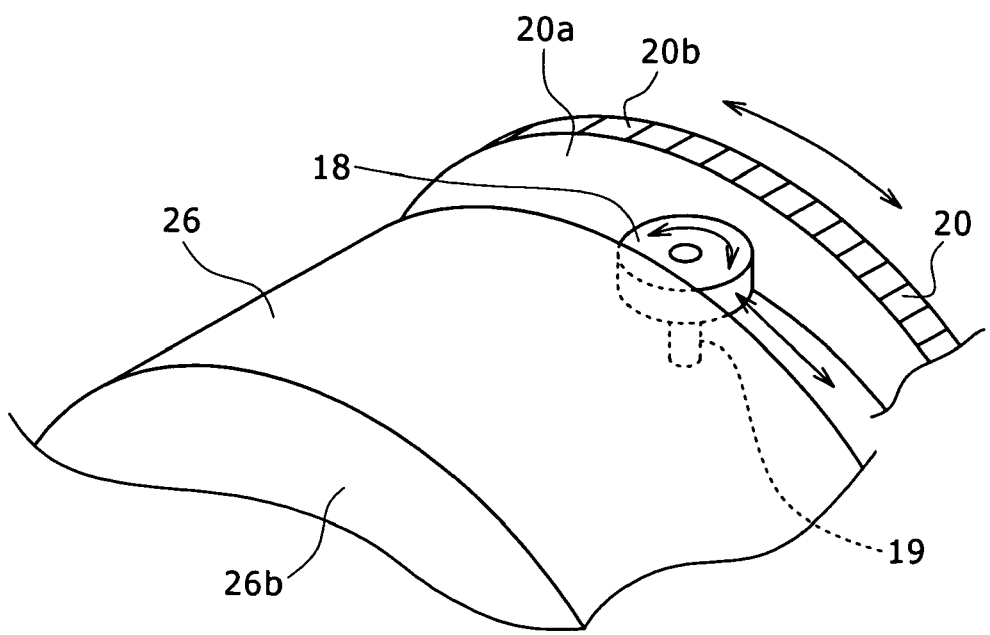
FIG. 5 is a conceptual diagram showing the operation of a first rotating member, a planetary roller, and a second rotating member in autofocus operation.

Therefore, in the state in which the first rotating member 20 is being rotated in the direction around the optical axis and the rotation of the second rotating member 26 is being restricted, the planetary rollers 18 are rotated (spun) by the driving force given from the first rotating member 20 and are rotated (revolved) monolithically with the cam member 17 in the direction around the optical axis (see FIG. 5). At this time, the planetary rollers 18 are rotationally moved on the back surface 26a of the second rotating member 26. In addition, the first rotating member 20 is rotated in such a state as to be in contact with the spherical parts 21b of the first bearing seat 21, and the spherical parts 21b are spun.

Figure 6:
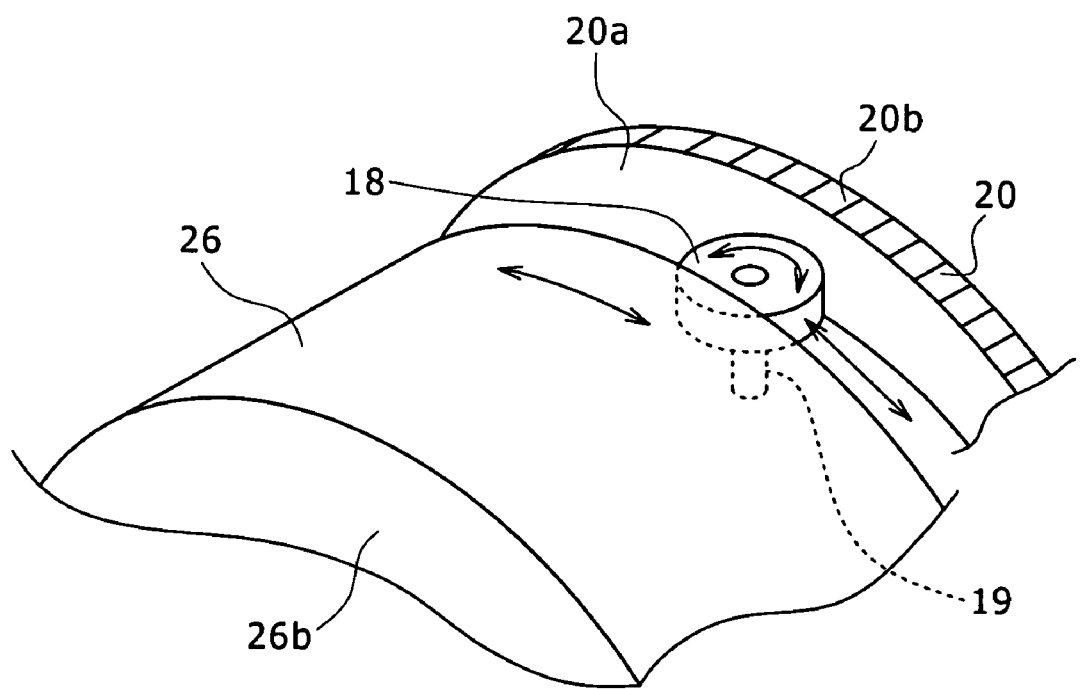
FIG. 6 is a conceptual diagram showing the operation of the first rotating member, the planetary roller, and the second rotating member in manual focus operation.

Furthermore, in the state in which the second rotating member 26 is being rotated in the direction around the optical axis and the rotation of the first rotating member 20 is being restricted, the planetary rollers 18 are rotated (spun) by the driving force given from the second rotating member 26 and are rotated (revolved) monolithically with the cam member 17 in the direction around the optical axis (see FIG. 6). At this time, the planetary rollers 18 are rotationally moved on the front surface 20a of the first rotating member 20, and the second rotating member 26 is slid on the second bearing seat 27.

The lens driving mechanism 16 is configured by the cam member 17, the planetary rollers 18, the support shafts 19, the first rotating member 20, the first bearing seat 21, the first deceleration gear 22, the second deceleration gear 23, the worm screw 24, the drive motor 25, the second rotating member 26, and the second bearing seat 27.

[Condition Formula about Worm Screw]

Figure 7:
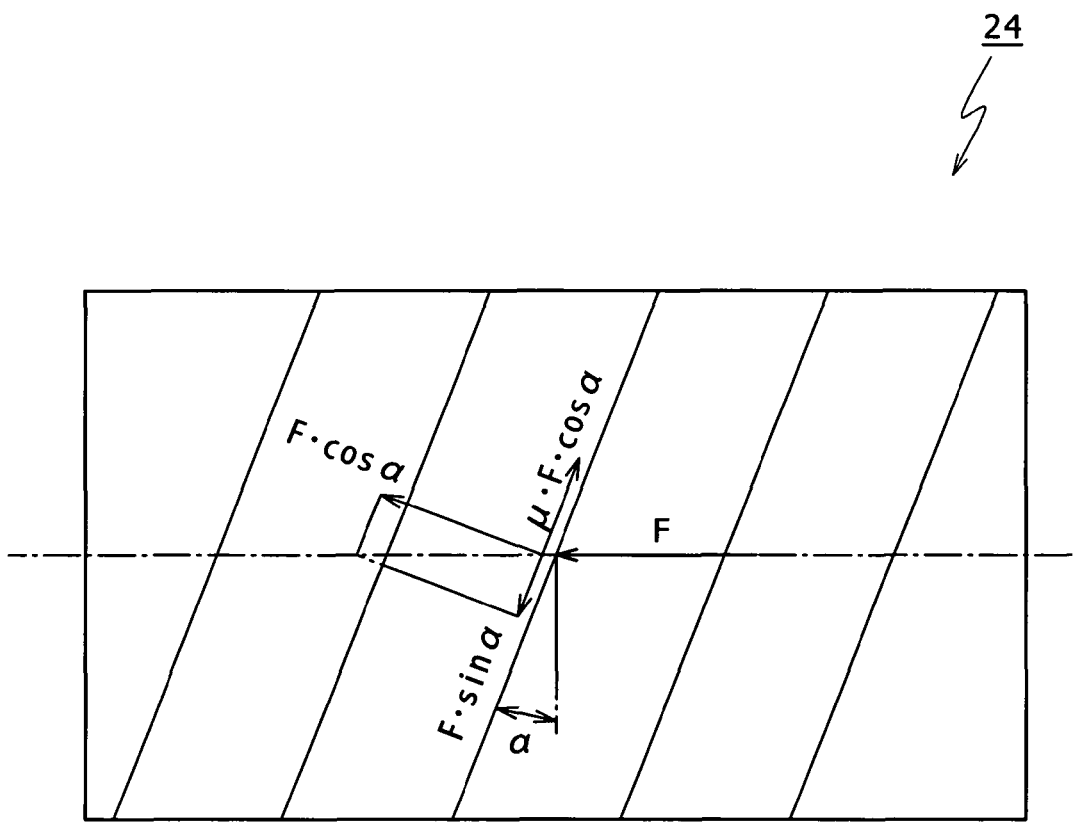
FIG. 7 is a schematic diagram for explaining a condition formula relating to a worm screw.

As described above, a load is given to the worm screw 24 along the rotation axis direction. As shown in FIG. 7, if the load given along the rotation axis direction is defined as F and the lead angle of the worm screw 24 is defined as $\alpha$, the load F can be resolved into a force component $F \cdot \sin \alpha$ parallel to the screw engagement surface between the worm screw 24 and the worm wheel 23a and a force component $F \cdot \cos \alpha$ perpendicular to the screw engagement surface.

If the friction coefficient of the frictional force generated on the screw engagement surface between the worm screw 24 and the worm wheel 23a at this time is defined as $\mu$, the frictional resistance is $\mu \cdot F \cdot \cos \alpha$ generated in the opposite direction to $F \cdot \sin \alpha$.

In the lens driving mechanism 16, the worm screw 24 and the worm wheel 23a are so configured that the force given along the direction parallel to the screw engagement surface is smaller than the frictional resistance working in the opposite direction to this force and thus the relationship between the lead angle $\alpha$ and the friction coefficient $\mu$ satisfies the following condition formulas.

$\mu \cdot F \cdot \cos \alpha > F \cdot \sin \alpha$  Condition formula (1)

i.e.

$\mu \cdot \cos \alpha > \sin \alpha$  Condition formula (2)

Therefore, condition formula (2) has no relation to the magnitude of F. If condition formula (2) is satisfied, even when rotational force is transmitted from the side of the first deceleration gear 22 to the second deceleration gear 23, the second deceleration gear 23 is not rotated because the rotation of the worm screw 24 is restricted. Because the rotation of the second deceleration gear 23 is thus prevented, the rotation of the first deceleration gear 22 and the first rotating member 20 is also prevented.

Specifically, when the second rotating member 26 is rotated in linkage with the rotation of the focus ring 12a, rotational force is given to the first rotating member 20 via the planetary rollers 18. However, because of the relationship represented by condition formula (2), the first rotating member 20, the first deceleration gear 22, the second deceleration gear 23, and the worm screw 24 are not rotated.

In contrast, when the worm screw 24, the second deceleration gear 23, the first deceleration gear 22, and the first rotating member 20 are rotated by the rotation of the drive motor 25, rotational force is given to the second rotating member 26 via the planetary rollers 18. However, the rotation of the second rotating member 26 is prevented by the frictional force between the second rotating member 26 and the second bearing seat 27.

[Operation of Lens Driving Mechanism]

In the lens driving mechanism 16 having the above-described configuration, autofocus operation is carried out in response to the rotation of the drive motor 25. If the drive motor 25 is rotated, the driving force thereof is sequentially transmitted to the worm screw 24, the second deceleration gear 23, the first deceleration gear 22, the first rotating member 20, and the planetary rollers 18. At this time, as described above, the second rotating member 26 is not rotated. Thus, the planetary rollers 18 are rotated (spun) and are rotated (revolved) monolithically with the cam member 17 in the direction around the optical axis (see FIG. 5). Therefore, the engagement parts 14a are slid in the cam trenches 17a depending on the rotational direction of the cam member 17, so that the movable lens 13 and the lens holding frame 14 are moved along the optical axis direction in such a manner as to be guided by the guide shafts 15. By the movement of the movable lens 13 along the optical axis direction, focusing (autofocus operation) is carried out.

On the other hand, in the lens driving mechanism 16, manual focus operation is carried out in response to the manual rotation of the focus ring 12a. If the focus ring 12a is rotated, the rotational force thereof is sequentially transmitted to the second rotating member 26 and the planetary rollers 18. At this time, as described above, the first rotating member 20 is not rotated because of the relationship represented by condition formula (2). Thus, the planetary rollers 18 are rotated (spun) and are rotated (revolved) monolithically with the cam member 17 in the direction around the optical axis (see FIG. 6). Therefore, the engagement parts 14*a* are slid in the cam trenches 17*a* depending on the rotational direction of the cam member 17, so that the movable lens 13 and the lens holding frame 14 are moved along the optical axis direction in such a manner as to be guided by the guide shafts 15. By the movement of the movable lens 13 along the optical axis direction, focusing (manual focus operation) is carried out.

[Summarization]

As described above, in the imaging device 1, the operation of the switch operation unit is not demanded for the switching between autofocus operation and manual focus operation. Furthermore, in the manual focus operation, the rotation of the first rotating member 20, the first deceleration gear 22, and the second deceleration gear 23 is restricted by the frictional force generated between the worm screw 24 and the worm wheel 23*a*.

Therefore, an expensive ultrasonic motor does not need to be used as the drive motor 25 and the operation of the switch operation unit is unnecessary. Consequently, the fast shooting performance in photography is ensured and the usability of the imaging device 1 can be enhanced without causing a large rise in the cost.

Furthermore, the configuration is not employed in which, in the manual focus operation, the rotation of the gear designed to rotate in the autofocus operation is prevented by the frictional force between a rotor and a stator. This can reduce restrictions on the weight of the movable lens 13 and the acceleration of the movable lens 13 at the time of the movement thereof.

In addition, because an expensive ultrasonic motor does not need to be used as the drive motor 25 as described above, a DC motor or a stepping motor can be used as the drive motor 25, which allows reduction in the manufacturing cost.

Moreover, because the number of threads of the worm screw 24 is set equal to or smaller than three, the lead angle α can be set small. Thus, size reduction of the worm screw 24 is facilitated, and the size reduction of the exchangeable lens 3 can be achieved.

Furthermore, because a ball bearing seat is used as the first bearing seat 21 for receiving the first rotating member 20, which rotates in the autofocus operation, the torque of the drive motor 25 can be reduced.

In addition, because a slide bearing seat is used as the second bearing seat 27 for receiving the second rotating member 26, which rotates in the manual focus operation, the frictional force generated between the second bearing seat 27 and the second rotating member 26 is large, and thus the rotation of the second rotating member 26 can be surely restricted by small force in the autofocus operation.

[Relationship Between Sizes of Bearing Seats]

In the lens driving mechanism 16, two bearing seats, i.e. the first bearing seat 21 as a ball bearing seat and the second bearing seat 27 as a slide bearing seat, are provided. It is preferable that the radius of the second bearing seat 27 be set larger than that of the first bearing seat 21.

Figure 8:
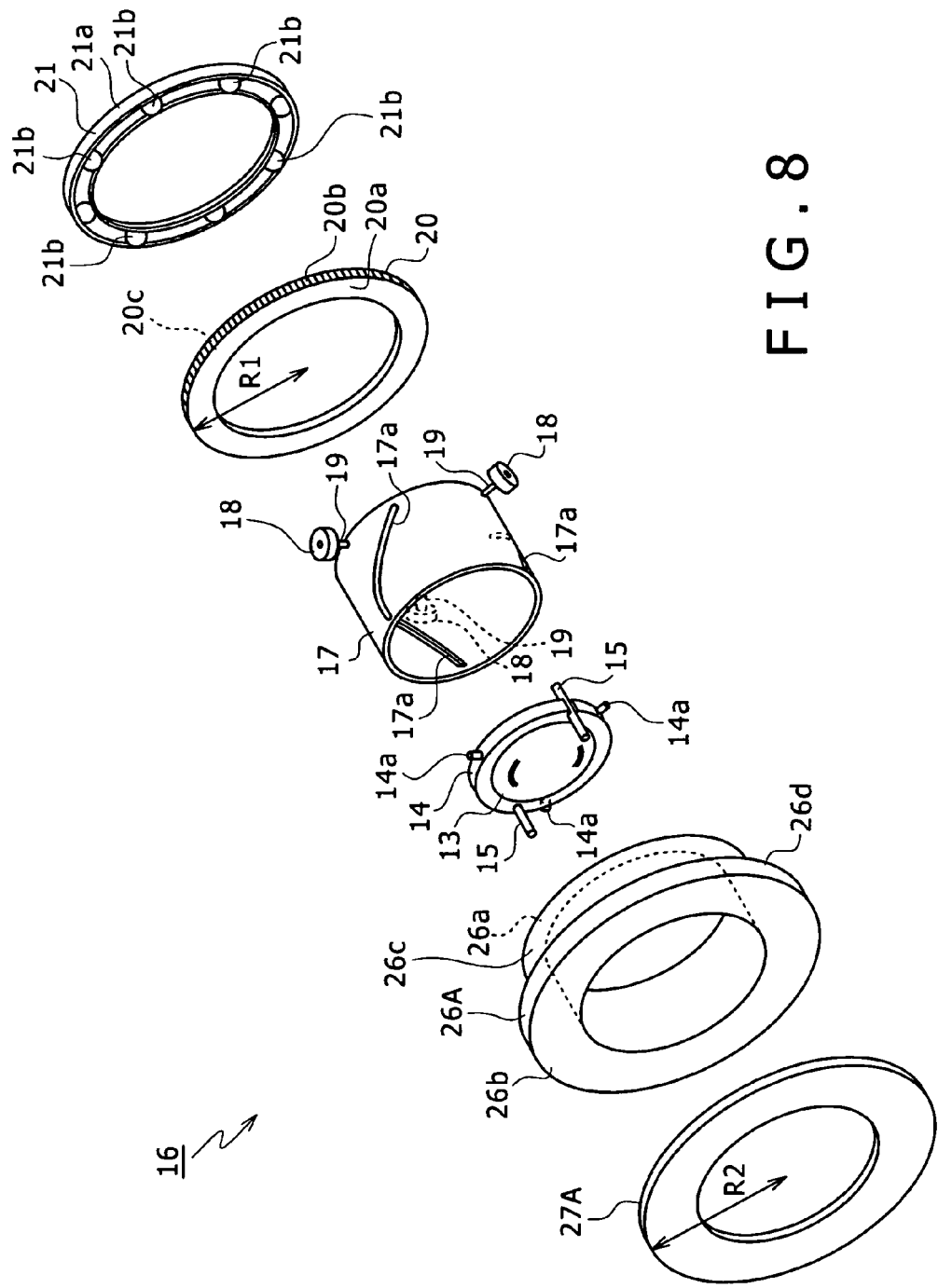
FIG. 8 is an exploded perspective view showing the relationship between the radii of a first bearing seat and a second bearing seat.

For example, a configuration shown in FIG. 8 may be employed. Specifically, a second rotating member 26A is composed of a smaller-radius part 26*c* on the back side and a larger-radius part 26*d* on the front side, and a second bearing seat 27A that has a large radius in matching with the larger-radius part 26*d* is used. If the radius of the first bearing seat 21 is defined as R1 and the radius of the second bearing seat 27A is defined as R2, the relationship R2>R1 is satisfied.

By thus setting the radius R2 of the second bearing seat 27A large, large frictional force can be generated between the second bearing seat 27A and the second rotating member 26A. Thus, in the autofocus operation, the rotation of the second rotating member 26A can be surely restricted by smaller force.

[Others]

In the above-described embodiment, focusing is carried out by the movement of the movable lens 13 along the optical axis direction. However, it is also possible that zooming is carried out by the movement of the movable lens 13 along the optical axis direction.

The above-described embodiment of the present invention relates to application to an exchangeable lens and an imaging device provided with this exchangeable lens as an example. However, the present embodiment can be applied also to a so-called lens-integrated imaging device including a device main body and a lens barrel provided for this device main body.

In such a lens-integrated imaging device, plural lenses, a guide shaft, and a lens driving mechanism are disposed in the lens barrel.

However, part of the lens driving mechanism may be disposed in the device main body.

It is also possible that the imaging device 1 provided with the exchangeable lens 3 has a configuration in which part of the lens driving mechanism is disposed in the device main body.

The specific shapes and structures of the respective components shown in the above-described best mode are all merely examples of embodiment in carrying out the present invention, and the technical scope of the present invention should not be interpreted in a limited manner because of them.

What is claimed is:

1. An exchangeable lens comprising:

a cam member configured to have a cam driving part and be capable of rotating in a direction around an optical axis;

a plurality of lenses configured to be disposed on the optical axis and include at least one movable lens that is capable of moving along an optical axis direction and allows focus adjustment or zoom adjustment through movement of the movable lens along the optical axis direction;

a lens holding frame configured to have an engagement part slidably engaged with the cam driving part of the cam member and hold the movable lens, the lens holding frame being moved monolithically with the movable lens along the optical axis direction in linkage with rotation of the cam member in the direction around the optical axis;

a drive motor configured to serve as a drive source for movement of the movable lens along the optical axis direction;

a worm screw configured to be fixed to a motor shaft of the drive motor;

a worm wheel configured to be meshed with the worm screw;

a planetary roller configured to be supported on the cam member rotatably in a direction around an axis perpendicular to the optical axis and be revolved around the optical axis in linkage with rotation of the cam member;

a first rotating member configured to be in contact with an outer circumferential surface of the planetary roller in a state of being biased in such a direction as to be pressed against the outer circumferential surface of the planetary roller, and be rotated in the direction around the optical axis through transmission of driving force of the drive motor to the first rotating member via the worm screw and the worm wheel;

a first bearing seat configured to receive the first rotating member on an opposite side to the planetary roller;

a second rotating member configured to be in contact with the outer circumferential surface of the planetary roller from an opposite side to the first rotating member in a state of being biased in such a direction as to be pressed against the outer circumferential surface of the planetary roller, and be rotated in the direction around the optical axis by manual operation; and a second bearing seat configured to receive the second rotating member on an opposite side to the planetary roller and restrict rotation of the second rotating member in the direction around the optical axis at the time of driving of the drive motor, wherein the worm screw and the worm wheel are so configured as to satisfy a condition represented by $\mu \cdot \cos \alpha > \sin \alpha$, where $\alpha$ is a lead angle of the worm screw and $\mu$ is a friction coefficient on a contact surface between the worm screw and the worm wheel.

2. The exchangeable lens according to claim 1, wherein the number of threads of the worm screw is equal to or smaller than three.

3. The exchangeable lens according to claim 1, wherein the first bearing seat is a ball bearing seat.

4. The exchangeable lens according to claim 1, wherein the second bearing seat is a slide bearing seat.

5. The exchangeable lens according to claim 1, wherein radius of the second bearing seat is larger than radius of the first bearing seat.

6. An imaging device including a device main body formed by disposing predetermined components inside and outside an external case and an exchangeable lens that is attachable and detachable to and from the device main body, the exchangeable lens comprising:

a cam member configured to have a cam driving part and be capable of rotating in a direction around an optical axis;

a plurality of lenses configured to be disposed on the optical axis and include at least one movable lens that is capable of moving along an optical axis direction and allows focus adjustment or zoom adjustment through movement of the movable lens along the optical axis direction;

a lens holding frame configured to have an engagement part slidably engaged with the cam driving part of the cam member and hold the movable lens, the lens holding frame being moved monolithically with the movable lens along the optical axis direction in linkage with rotation of the cam member in the direction around the optical axis;

a drive motor configured to serve as a drive source for movement of the movable lens along the optical axis direction;

a worm screw configured to be fixed to a motor shaft of the drive motor;

a worm wheel configured to be meshed with the worm screw;

a planetary roller configured to be supported on the cam member rotatably in a direction around an axis perpendicular to the optical axis and be revolved around the optical axis in linkage with rotation of the cam member;

a first rotating member configured to be in contact with an outer circumferential surface of the planetary roller in a state of being biased in such a direction as to be pressed against the outer circumferential surface of the planetary roller, and be rotated in the direction around the optical axis through transmission of driving force of the drive motor to the first rotating member via the worm screw and the worm wheel;

a first bearing seat configured to receive the first rotating member on an opposite side to the planetary roller;

a second rotating member configured to be in contact with the outer circumferential surface of the planetary roller from an opposite side to the first rotating member in a state of being biased in such a direction as to be pressed against the outer circumferential surface of the planetary roller, and be rotated in the direction around the optical axis by manual operation; and a second bearing seat configured to receive the second rotating member on an opposite side to the planetary roller and restrict rotation of the second rotating member in the direction around the optical axis at the time of driving of the drive motor, wherein the worm screw and the worm wheel are so configured as to satisfy a condition represented by $\mu \cdot \cos \alpha > \sin \alpha$, where $\alpha$ is a lead angle of the worm screw and $\mu$ is a friction coefficient on a contact surface between the worm screw and the worm wheel.

7. An imaging device including a device main body formed by disposing predetermined components inside and outside an external case and a lens barrel provided for the device main body, the lens barrel comprising:

a cam member configured to have a cam driving part and be capable of rotating in a direction around an optical axis;

a plurality of lenses configured to be disposed on the optical axis and include at least one movable lens that is capable of moving along an optical axis direction and allows focus adjustment or zoom adjustment through movement of the movable lens along the optical axis direction;

a lens holding frame configured to have an engagement part slidably engaged with the cam driving part of the cam member and hold the movable lens, the lens holding frame being moved monolithically with the movable lens along the optical axis direction in linkage with rotation of the cam member in the direction around the optical axis;

a drive motor configured to serve as a drive source for movement of the movable lens along the optical axis direction;

a worm screw configured to be fixed to a motor shaft of the drive motor;

a worm wheel configured to be meshed with the worm screw;

a planetary roller configured to be supported on the cam member rotatably in a direction around an axis perpendicular to the optical axis and be revolved around the optical axis in linkage with rotation of the cam member;

a first rotating member configured to be in contact with an outer circumferential surface of the planetary roller in a state of being biased in such a direction as to be pressed against the outer circumferential surface of the planetary roller, and be rotated in the direction around the optical axis through transmission of driving force of the drive motor to the first rotating member via the worm screw and the worm wheel;

a first bearing seat configured to receive the first rotating member on an opposite side to the planetary roller;

a second rotating member configured to be in contact with the outer circumferential surface of the planetary roller from an opposite side to the first rotating member in a state of being biased in such a direction as to be pressed against the outer circumferential surface of the planetary roller, and be rotated in the direction around the optical axis by manual operation; and
a second bearing seat configured to receive the second rotating member on an opposite side to the planetary roller and restrict rotation of the second rotating member in the direction around the optical axis at the time of driving of the drive motor, wherein the worm screw and the worm wheel are so configured as to satisfy a condition represented by $\mu \cdot \cos \alpha > \sin \alpha$, where $\alpha$ is a lead angle of the worm screw and $\mu$ is a friction coefficient on a contact surface between the worm screw and the worm wheel.

* * * * *